United States Patent [19]

Le Duc et al.

[11] 4,363,848

[45] Dec. 14, 1982

[54] THREE LAYERED FOAM-CONTAINING LAMINATE SUITABLE FOR USE AS AN AUTOMOBILE HEADLINER

[75] Inventors: Edward C. Le Duc; John C. Schubert, both of Chippewa Falls, Wis.

[73] Assignee: Standard Oil Company (Indiana), Chicago, Ill.

[21] Appl. No.: 269,518

[22] Filed: Jun. 1, 1981

[51] Int. Cl.$^3$ .............. B29D 27/04; B32B 5/18; B60J 9/00

[52] U.S. Cl. .................... 428/286; 296/214; 428/317.7; 428/318.6; 428/319.9

[58] Field of Search ............ 428/286, 317.7, 318.6, 428/319.9; 296/214

[56] References Cited

U.S. PATENT DOCUMENTS

| | | | |
|---|---|---|---|
| 3,110,905 | 11/1963 | Rhodes | 428/97 |
| 3,507,728 | 4/1970 | Bock et al. | 156/257 |
| 3,605,666 | 9/1971 | Kimmel et al. | 428/234 |
| 3,616,020 | 10/1971 | Whelan | 156/324 |
| 3,867,240 | 2/1975 | Doerflin | 428/80 |
| 4,123,577 | 10/1978 | Port et al. | 428/95 |
| 4,211,590 | 7/1980 | Steward et al. | 428/319.9 |
| 4,256,797 | 3/1981 | Stamper et al. | 428/90 |

Primary Examiner—James C. Cannon
Attorney, Agent, or Firm—Robert R. Cochran; William T. McClain; William H. Magidson

[57] ABSTRACT

Laminate suitable for use as automobile trim panel or headliner comprising the following layers: (1) polypropylene fabric, (2) a solid layer comprising a physical mixture of a copolymer of styrene and maleic anhydride, preferably a rubber modified copolymer, and polypropylene and (3) a foam of a copolymer of styrene and maleic anhydride. The laminates can be shaped by thermoforming. Optionally the laminate can contain, on the foam side opposite the fabric, a sheet or film of a rubber modified copolymer of styrene and maleic anhydride.

6 Claims, No Drawings

THREE LAYERED FOAM-CONTAINING LAMINATE SUITABLE FOR USE AS AN AUTOMOBILE HEADLINER

In the last few years, automobile trim panels and headliners prepared from laminated articles have come into wide use. A component of such panels comprises a foam sheet having films bonded to each side of the sheet referred to as the substrate. To this substrate, there may be attached a polyurethane foam and a decorative layer attached thereto such as a fabric. Various thermoformed decorative panels which can be formed by thermoforming are shown in U.S. Pat. Nos. Doerfling 3,867,240 (1975), Bock et al. 3,507,728 (1970), and Stamper et al. 4,256,797 (1981). A less expensive panel or headliner would result if the decorative layer could be directly attached to the foam. A problem in preparing such economy headliners has been the difficulty in obtaining a suitable bond between the foam layer and the decorative layer.

An object of this invention is to provide an improved adhesive for joining the foam surface to the decorative layer. A further object of this invention is to provide an improved trim panel comprising a foam layer and, bonded thereto, a decorative layer.

Broadly then this invention relates to a decorative laminate comprising the following layers in order: (1) polypropylene fabric, (2) a solid layer comprising a physical mixture of a copolymer of styrene and maleic anhydride, preferably a rubber modified or so-called "impact" copolymer, and polypropylene, and (3) a foam of a copolymer of styrene and maleic anhydride. Optionally, a solid sheet or film of a copolymer of styrene and maleic anhydride can be applied to the foam layer opposite the polypropylene fabric layer.

Any fabric based on polypropylene can be used in this invention but we prefer to use a needle bonded composite fabric in which fibers are bonded to a primary backing fabric by a needling process. Such a needling process is shown in Kimmel et al. U.S. Pat. No. 3,605,666 (1971). Another process of preparing the facing fabric is shown in Port et al., U.S. Pat. No. 4,123,577 (1978) wherein fibers are applied to the primary backing by a hot calendering operation. The primary backing preferred is a woven polypropylene fabric using oriented tape or slit film yarns. Tape yarn fabric is shown in Rhodes U.S. Pat. No. 3,110,905 (1963). Each of the three patents mentioned is incorporated by reference.

The foam layer is a copolymer of styrene and maleic anhydride. Such a resin is available from Arco Polymers, Inc. under the name Dylark resins. The suitable polymers are prepared containing styrene and approximately 2 to 15 percent by weight of maleic anhydride in the copolymer. Dylark 232 is an example. The rubber modified styrene maleic anhydride copolymers, the impact grade, are similar but contain 3 to 10 percent of a polybutadiene rubber to give the desired impact resistance. Dylark 250 is an example of this material.

In order to obtain a good bond between the Dylark 232 foam layer and the polypropylene fabric, we use, as the adhesive, a blend of the styrene maleic anhydride copolymers and polypropylene. Suitable blends contain 20 to 80 percent by weight of the copolymer of styrene and maleic anhydride, preferably the rubber modified grade, and 80 to 20 percent by weight of polypropylene. Preferably, 40 to 60 percent of the composition is the polypropylene.

Suitable for use as the polypropylene component to be mixed with the styrene maleic anhydride copolymer to be used as the hot melt adhesive are polypropylene resins having a melt flow rate in the same range is the styrene maleic anhydride copolymer. Generally, this flow rate should be in the range of 30 to 50. An example is Amoco 29-5240 polypropylene which has a flow rate in the range of 33 to 41 according to a ASTM D1238.

The laminate of this invention can be prepared according to the coating process described in Whelan et al. U.S. Pat. No. 3,616,020 (1971), hereby incorporated by reference. If the desired structure is the three component one containing foam, adhesive, and decorative layers, the coating system of FIG. 1 of this patent can be used. If an additional film layer opposite the fabric layer is desired, the coating system of FIG. 2 of the patent can be used. In either event, the fabric is applied to the nip between the nip roller and is applied to the nip simultaneously with the supply of adhesive which is supplied as a melt of the two polymeric materials. Good adhesion results from this system.

The following example illustrates a specific embodiment of this invention, but it should not be considered unduly limiting.

EXAMPLE

Dylark 250, the rubber modified styrene maleic anhydride copolymer described above, was mixed with Amoco 29-5240 polypropylene on a 50/50 weight basis. The blend can be prepared in a static mixer. Generally, the system of Whelan et al. was used in preparing the laminate with minor exceptions using the system of FIG. 2. The foam consisting of Dylark 232 resin was extruded and fed directly to the nip adjacent to a first extruder. A film of Dylark 250 was applied at this station. Subsequently, the coated foam was fed to the die following the second extruder and the blend of Dylark 250 and polypropylene extruded onto the foam. Simultaneously therewith, the polypropylene fabric was supplied to the nip and the laminate recovered by the take-off system including a cutting device to produce flat sheets rather than a wind-up system. The fabric was the product produced by needle punching polypropylene fibers into a primary backing woven of polypropylene tape yarns.

The product exhibited good adhesion between the foam and the fabric layer, and the laminate was suitable for use in a thermoforming process. Obviously, the material need not be thermoformed where a flat article such as a trunkliner is desired.

It will be obvious to those skilled in the art that many variations and modifications can be made in connection with the detailed description set forth above without departing from the broad scope of the invention.

We claim:

1. A decorative laminate comprising the following layers in order: (1) polypropylene fabric, (2) a solid layer comprising a physical mixture of a copolymer of styrene and maleic anhydride and polypropylene, and (3) a foam of a copolymer of styrene and maleic anhydride.

2. The laminate of claim 1 wherein the copolymer in layer (2) is a rubber modified or impact grade copolymer.

3. The laminate of claim 1 wherein layer (2) contains 20 to 80 percent by weight of the copolymer of styrene and maleic anhydride and 80 to 20 percent by weight of polypropylene.

4. The laminate of claim 1 wherein layer (2) contains 40 to 60 by weight of the copolymer of styrene and maleic anyhydride and 60 to 40 percent by weight of polypropylene.

5. The laminate of claim 1 wherein the polypropylene in layer (2) has a melt flow rate of 30 to 50.

6. The laminate of claim 1 further comprising, as a layer (4), a solid sheet or film of rubber modified copolymer of styrene and maleic anhydride opposite layer (1).

* * * * *